(12) United States Patent
Tiefenbrunn et al.

(10) Patent No.: US 11,194,232 B2
(45) Date of Patent: Dec. 7, 2021

(54) CLAMP FOR CAMERA MOUNT

(71) Applicants: Larry J Tiefenbrunn, East Brunswick, NJ (US); Merin Swasey, North Logan, UT (US)

(72) Inventors: Larry J Tiefenbrunn, East Brunswick, NJ (US); Merin Swasey, North Logan, UT (US)

(73) Assignee: Merin Swasey, North Logan, UT (US)

( * ) Notice: Subject to any disclaimer, the term of this patent is extended or adjusted under 35 U.S.C. 154(b) by 68 days.

(21) Appl. No.: 16/734,395

(22) Filed: Jan. 5, 2020

(65) Prior Publication Data

US 2020/0218139 A1 Jul. 9, 2020

Related U.S. Application Data

(60) Provisional application No. 62/788,956, filed on Jan. 7, 2019.

(51) Int. Cl.
| | |
|---|---|
| *G03B 17/56* | (2021.01) |
| *F16M 11/08* | (2006.01) |
| *F16B 2/12* | (2006.01) |
| *F16M 11/04* | (2006.01) |

(52) U.S. Cl.
CPC .............. *G03B 17/561* (2013.01); *F16B 2/12* (2013.01); *F16M 11/041* (2013.01); *F16M 11/08* (2013.01)

(58) Field of Classification Search
CPC .... G03B 17/56; G03B 17/561; G03B 17/566; F16M 11/00; F16M 11/02; F16M 11/04; F16M 11/041; F16M 13/00; F16M 13/02; F16M 13/04; F16M 11/08; F16M 11/16
See application file for complete search history.

(56) References Cited

U.S. PATENT DOCUMENTS

| | | | |
|---|---|---|---|
| 7,407,143 B1* | 8/2008 | Chen | B60R 11/0241 248/309.1 |
| 2007/0158513 A1* | 7/2007 | LeVahn | A61B 17/02 248/229.21 |
| 2013/0193294 A1* | 8/2013 | Li | F16M 11/041 248/371 |

* cited by examiner

*Primary Examiner* — Clayton E. LaBalle
*Assistant Examiner* — Fang-Chi Chang
(74) *Attorney, Agent, or Firm* — Henry I. Schanzer

(57) ABSTRACT

Clamping apparatus for a camera mount includes two clamping jaws slidably coupled to each other so they can move towards or away from each other along a common plane. A rotatable jaw movement controlling mechanism having an eccentric (elliptical or variable contour) shaped inner surface is coupled around a portion of the two clamping jaws for controlling the movement of the two clamping jaws towards or away from each other. A ratcheting mechanism is coupled to the jaw movement controlling mechanism for preventing slippage of the two clamping jaws when the two clamping jaws are moving towards each other. The ratcheting mechanism may include a release button for releasing the ratcheting function and enabling the jaws to move away from each other quickly and without much effort.

16 Claims, 15 Drawing Sheets

CLAMP FOR CAMERA MOUNT

This invention claims priority based on a provisional application bearing Ser. No. 62/788,956 titled CLAMP FOR CAMERA MOUNT filed Jan. 7, 2019 whose teachings are incorporated herein by reference.

BACKGROUND OF THE INVENTION

This invention relates to a clamping apparatus and more particularly to clamping apparatus which does not require a knob-screw or a clasp for performing a clamping function. More particularly, the invention relates to non-screw knob (or clasp-less) clamping apparatus which can be attached to and between (a) a camera stabilizing equipment (e.g., a tripod, ball mount or any other camera stabilizing equipment; and (b) a base plate (such as an ARCA plate) to which a camera may be attached, or any suitable item to be clamped.

Prior art FIGS. 1A, 1B and 1C, show a known clamp 300 attached to a ball mount (tripod head) 302 via a screw 304. The clamp 300 includes two jaws (303, 303b) and a knob screw 306 which is used to secure (tighten) or release (loosen) a base plate 108 (also referred to generally in the camera art as an ARCA-Swiss plate) inserted between the jaws (303a, 303b) of the clamp 300.

Typically, a base plate 108 will have a predetermined width (e.g., 35 mm) but can vary in length. The base plate 108 normally includes a screw 204 to enable the plate 108 to be firmly attached to a camera 200 (or a lens or any other photographic device) by means of screw 204, as shown in simplified cross-section in FIG. 1C. The clamp 300 is a mounting base having jaws 303a and 303b between which the base plate 108 is attached and secured. The clamp 300 can be opened (jaws 303a, 303b can be separated) by turning the knob screw 306 in one direction to enable base plate 108 to be placed between the jaws 303a, 303b. Then, the knob screw 306 can be turned in the opposite direction (to the one direction) to secure the plate 108 within the clamp 300. The prior art clamp shown and discussed above is relatively simple.

However, the knob screw 306 extends outward and creates a problem to compactly package/stow the clamp. Also, the knob screw 306 presents a problem in that it generally requires one hand to hold the ball mount and another hand to turn the knob screw 306. Still further, a significant amount of force and time have to be exerted to turn the knob screw in one or the other direction. Also, the tightening screw may be located in an inconvenient place and may not be easily accessible.

These problems extend to all known prior art clamps for camera mounts.

The problems discussed above are overcome in clamping mechanisms embodying the invention.

BRIEF SUMMARY OF THE INVENTION

Clamping apparatus for camera mounts embodying the invention eliminate the need for knob screws or clasps extending externally to the clamp. The apparatus may be operated with one hand and enables speedy "clamping" and "unclamping".

A clamping apparatus for a camera mount embodying the invention includes two clamping jaws (also referred to as "plates") slidably coupled to each other so they can move towards or away from each other along a common plane. A rotatable jaw movement controlling mechanism having an eccentric (elliptical or variable contour) shaped inner surface is coupled to the two clamping jaws for controlling the movement of the two clamping jaws towards or away from each other. A ratcheting mechanism is coupled to the jaw movement controlling mechanism for preventing slippage of the two clamping jaws when the two clamping jaws are moving towards each other. The ratcheting mechanism may include a release button for releasing the ratcheting function and enabling the jaws to move away from each other quickly and without much effort.

In one embodiment of the invention, the clamping mechanism includes a stationary jaw and a "slidable" (i.e., moveable) jaw. The "eccentric" inner surface of the jaw movement controllable mechanism is shaped to: (a) enable the moveable jaw to quickly slide towards the stationary jaw and engage any item (e.g., a base plate) located between the two jaws; and (b) such that it can provide a large clamping force with minimal movement of the moveable (sliding) jaw.

Note as used herein, and in the accompanying claims, reference to the inner surface as "eccentric" means that it can have any shape customized to move the sliding portion of the clamp (a) inwards, towards the stationary jaw; or (b) outwards, away from the stationary jaw, as the inner ring is rotated one way or the other.

Clamps embodying the invention enable an item-to-be-clamped to be inserted between the two jaws of the clamping mechanism and then the item can be rotated causing the jaws to tighten and clamp the item. This may be referred to as "self-clamping" since it is the rotation of the item to be clamped which causes the clamping.

BRIEF DESCRIPTION OF THE DRAWINGS

In the accompanying drawings which are not drawn to scale like reference characters denote like components.

DESCRIPTION OF THE INVENTION

Figure 1A:
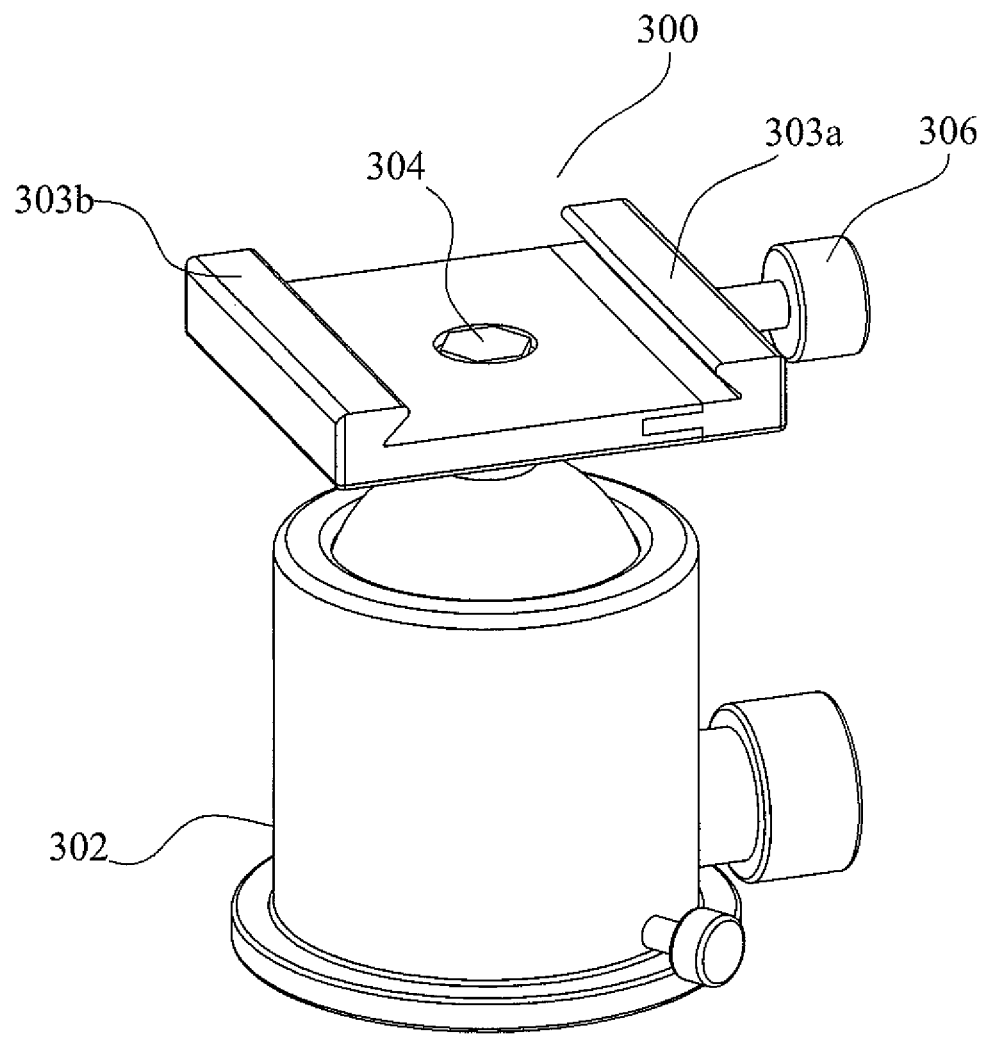
FIGS. 1A, 1B and 1C are simplified drawings of a typical prior art camera mount clamping arrangement.
Figure 1B:
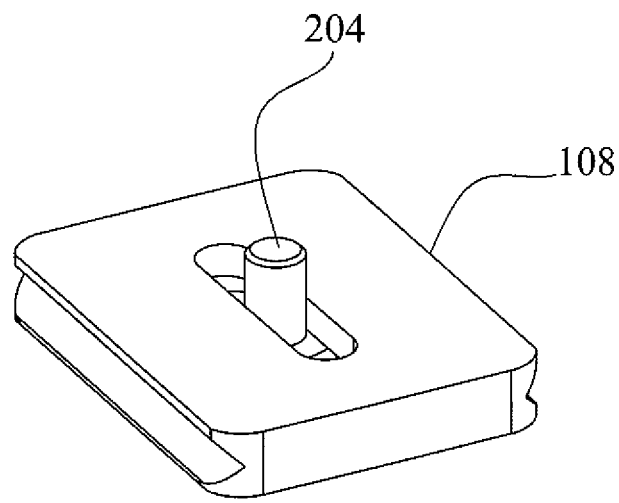
Figure 1C:
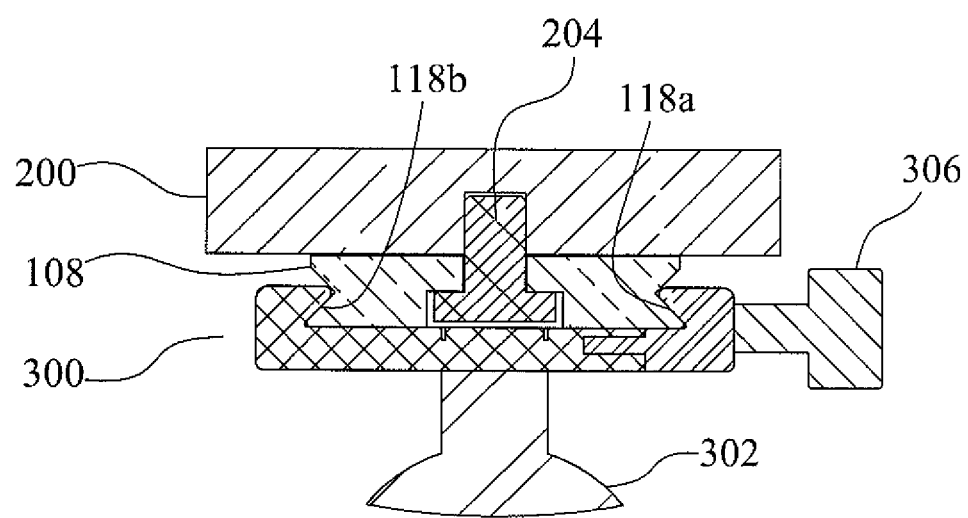
Figure 2:
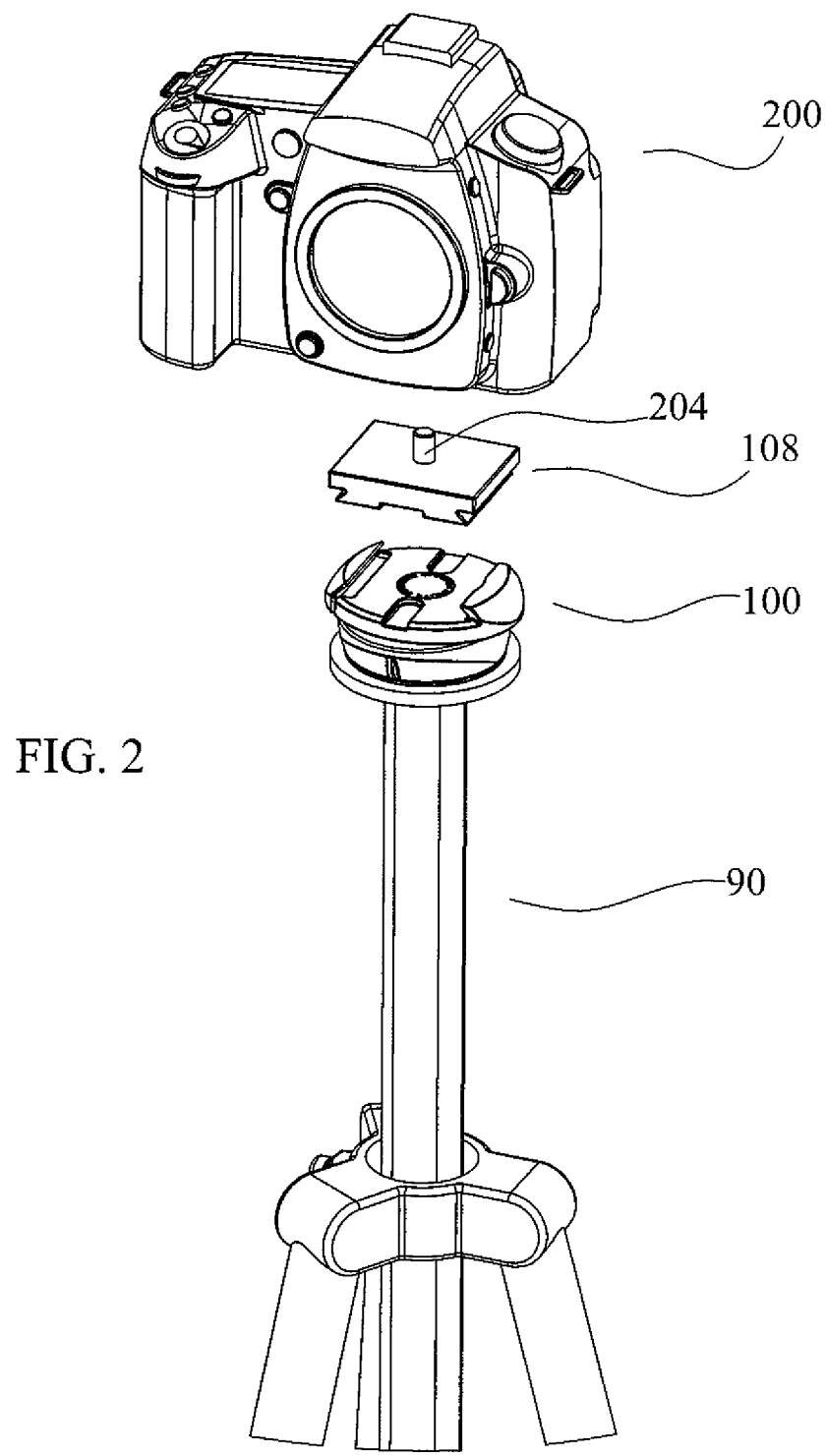
FIG. 2 is a highly simplified isometric exploded view of a clamping apparatus (100) embodying the invention mounted on a tripod with a base plate and camera.
Figures 3, 4:
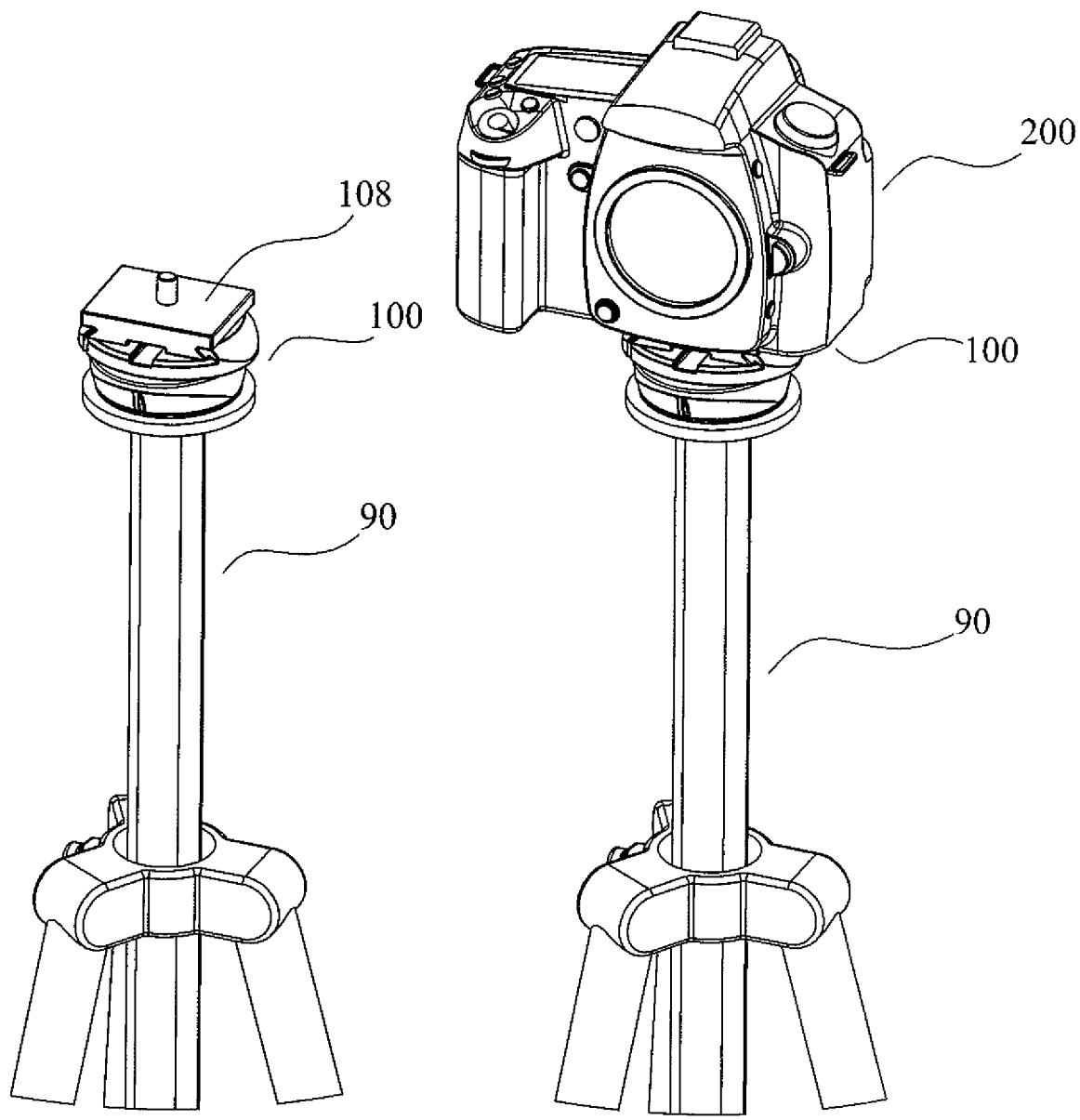
FIG. 3 is a highly simplified isometric drawing of a clamping apparatus embodying the invention mounted on a tripod with a base plate mounted on the clamping apparatus.
FIG. 4 is a highly simplified isometric drawing of a clamping apparatus embodying the invention mounted on a tripod with a base plate mounted on the clamping apparatus and a camera mounted on the base plate.

FIGS. 2, 3 and 4, show a clamping apparatus 100, embodying the invention, mounted on a tripod 90. The clamping apparatus 100 can be used to clamp a base plate 108 to which a camera 200 can be attached.

FIG. 2 is an exploded view showing the clamping mechanism 100 mounted on a tripod 90 and a view of the base plate 108 and a camera 200 to be assembled together.

FIG. 3 shows the base plate 108 of FIG. 2 inserted within the clamping mechanism 100, to illustrate how the base plate 108 is coupled to the clamping mechanism 100. A camera 200 which would be attached to and mounted on the base plate 108 is not shown in this figure since it would hide the mounting of the base plate 108 to the clamping mechanism 100.

FIG. 4 shows a camera 200 mounted on the base plate 108 of FIG. 3 attached to the clamping mechanism 100. The base plate 108 is not seen clearly in this drawing as it sits below the camera.

The clamping apparatus 100, as shown in the Figures and as further discussed below, has no knob screw head or clasp extending exteriorly from the clamping assembly. This enables the manufacture of a sleek easy to pack camera mount clamp.

Figure 5:
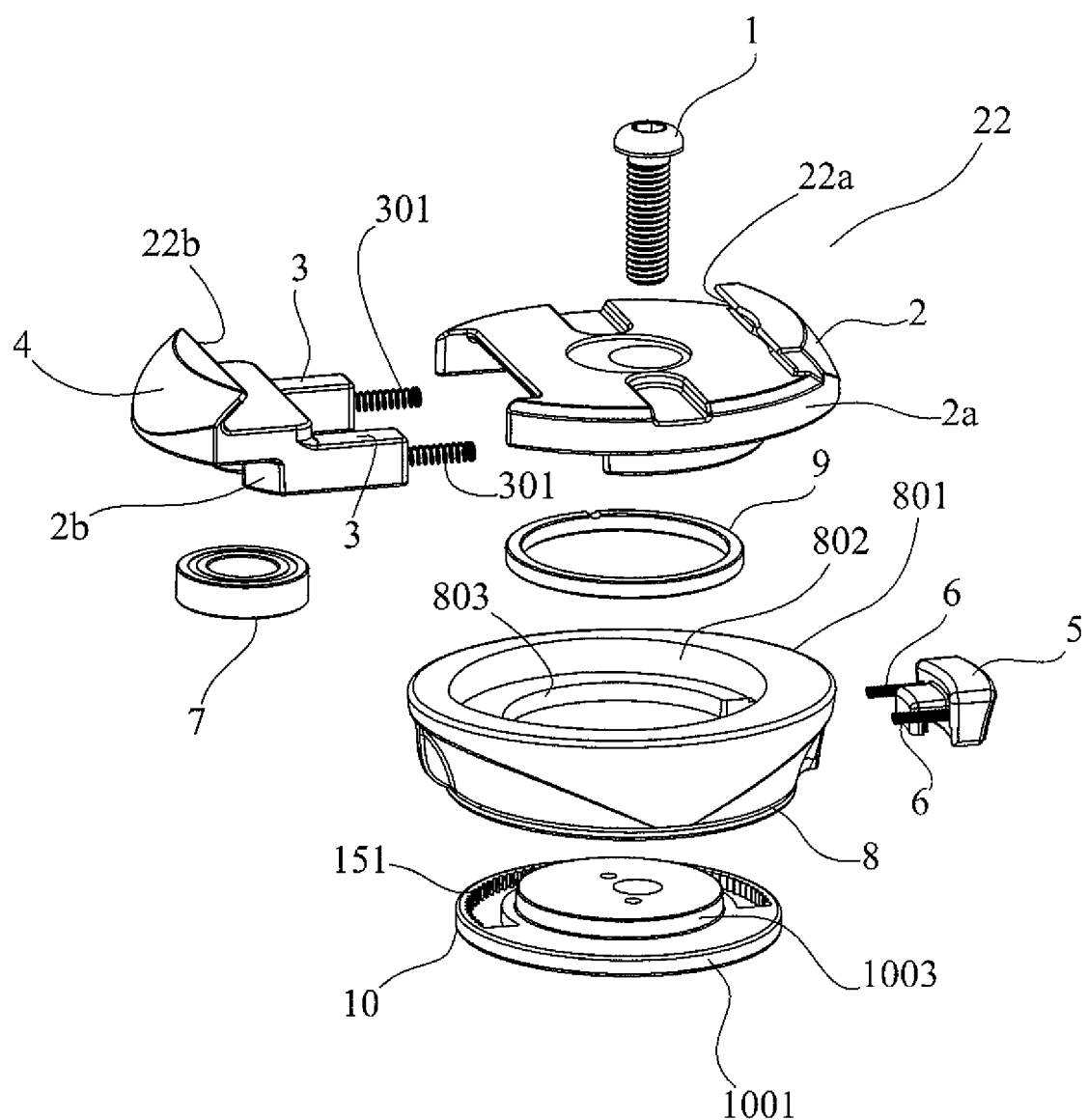
FIG. 5 is a simplified exploded view of some of the major components comprising a clamping mechanism embodying the invention.

FIG. 5 is an exploded view of the major components of a clamping mechanism 100 embodying the invention. These include screw head 1, jaws 2 and 4 forming clamping assembly 22, release button 5, bearing 7, eccentric housing 8, bushing 9, and ratchet plate 10.

Figure 7:
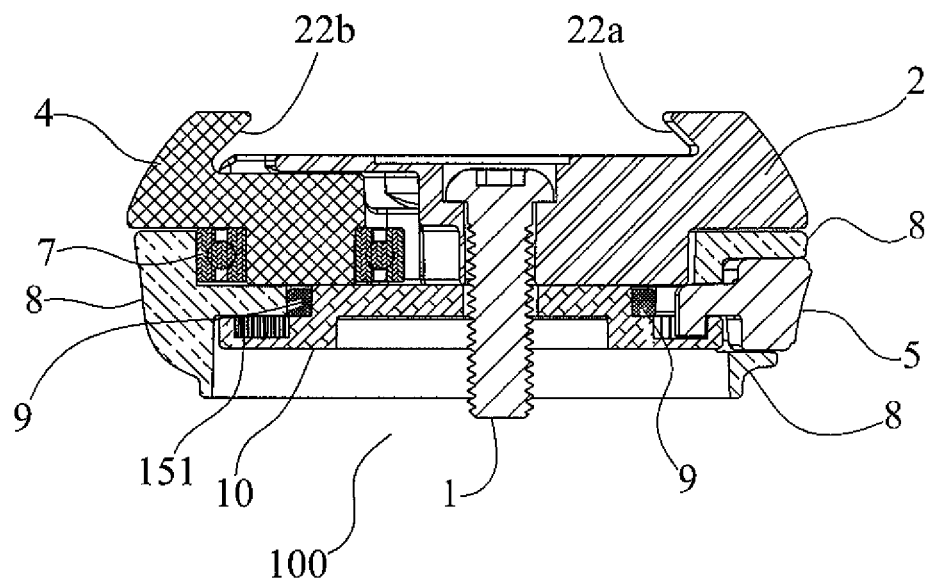
FIG. 7 is a simplified cross sectional diagram of the clamping apparatus of FIGS. 5, and 6 through the center of the assembly.
Figure 8:
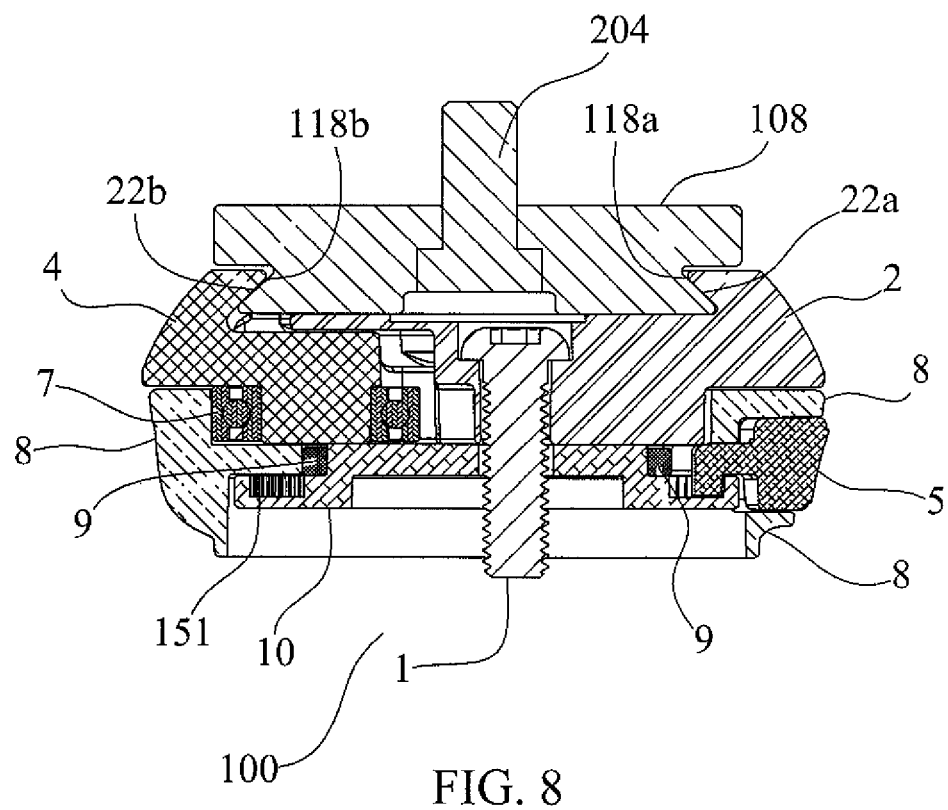
FIG. 8 is a simplified cross sectional diagram of the clamping mechanism of FIG. 7 with a base plate mounted thereon in accordance with the invention.
Figure 9:
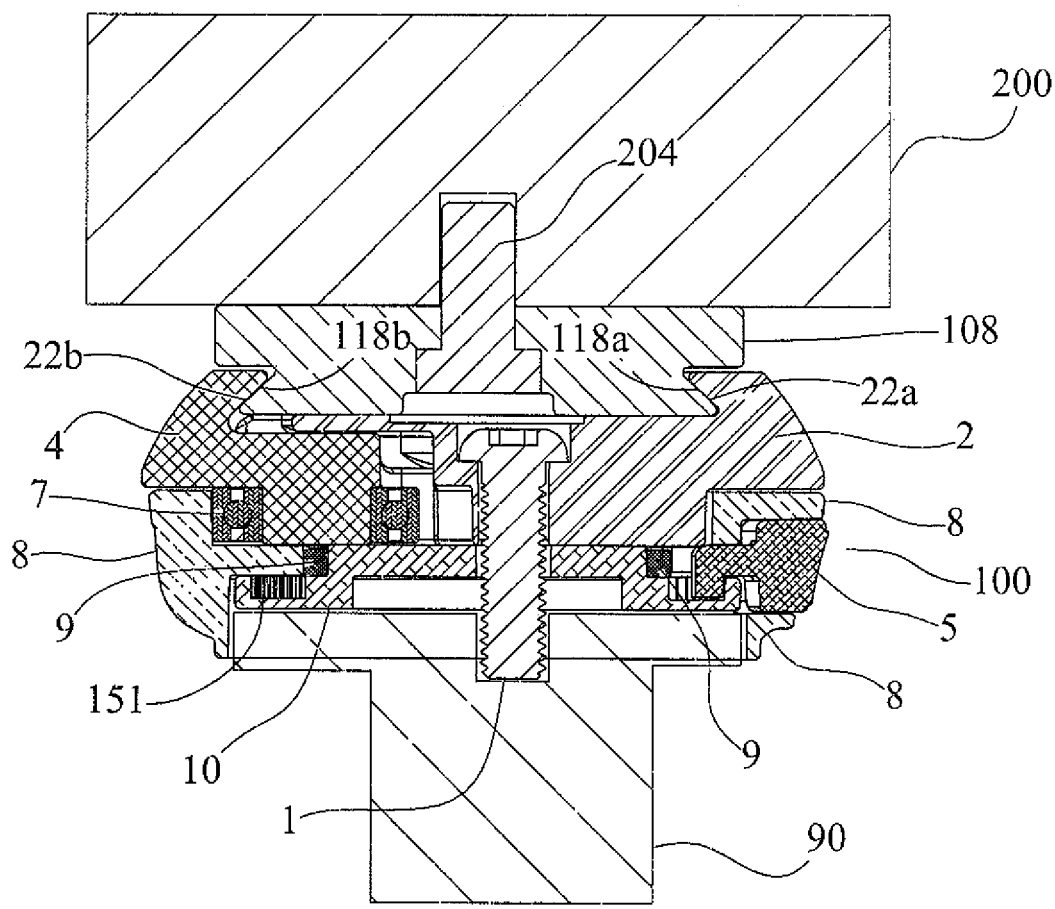
FIG. 9 is a highly simplified cross sectional diagram of a clamping mechanism embodying the invention with a base plate and a camera mounted thereon.
Figure 10:
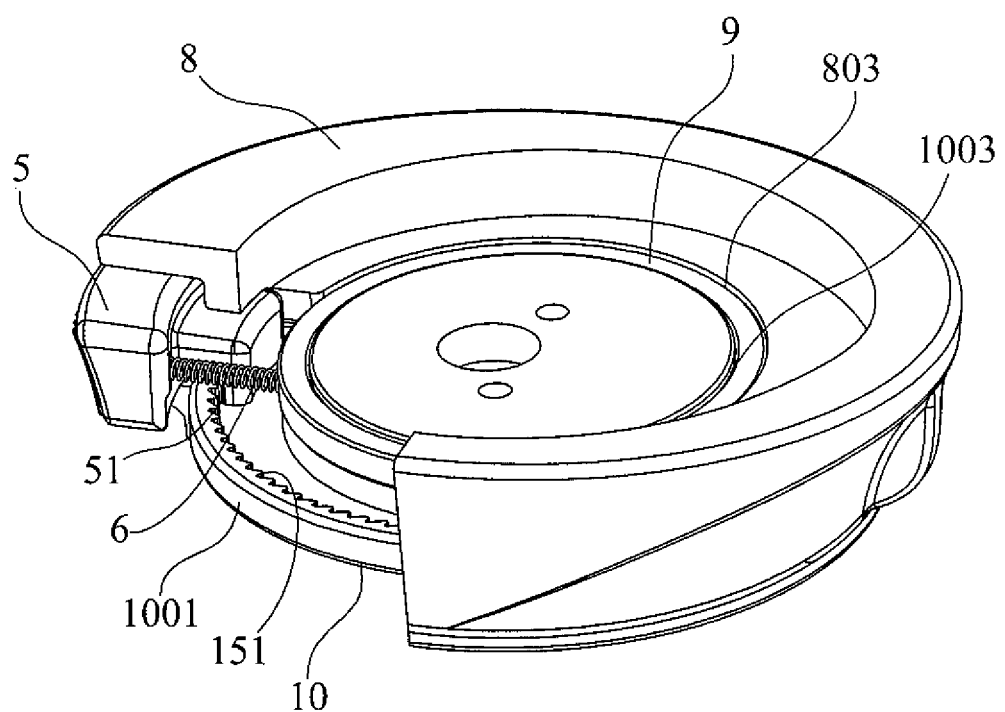
FIGS. 10, 10A, 10B and 10C are isometric views of the housing, reset switch and other components forming the ratchet assembly.
Figure 10A:
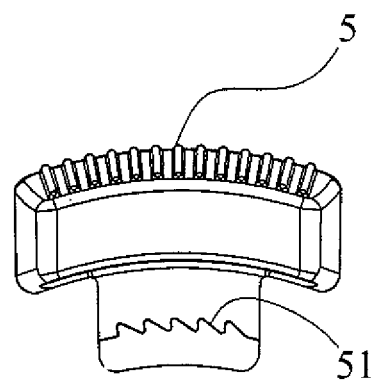
Figure 10B:
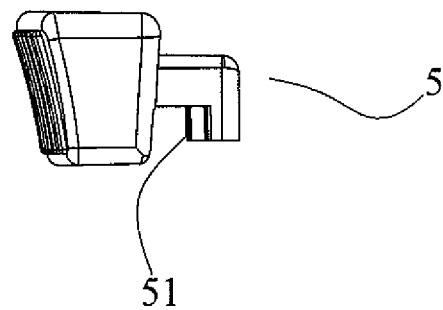
Figure 10C:
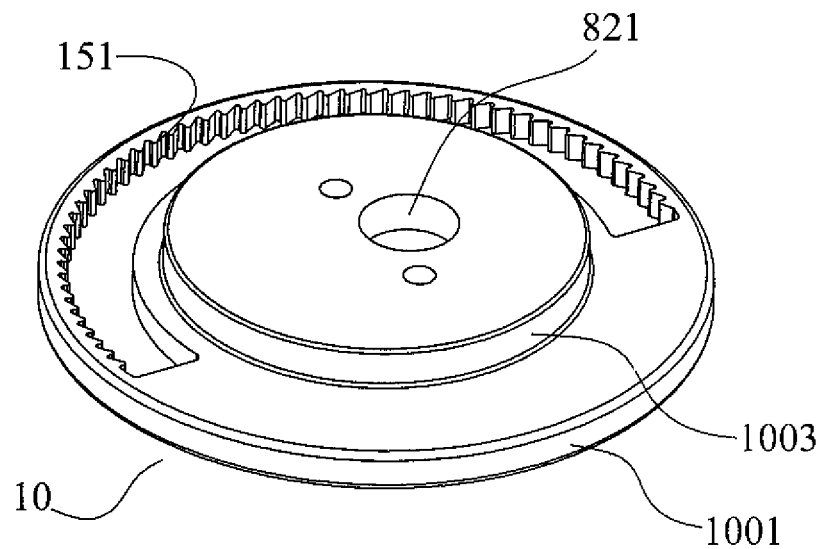

FIGS. 5, 5A and 5B and FIGS. 7, 8 and 9 show the intercoupling and operation of these components. Button head screw 1 extends along the vertical length of clamp assembly 100. The clamping mechanism 22 includes the two clamping jaws or plates (2, 4) slidably coupled to each other so they can move towards or away from each other along a common plane (horizontally in the Figures). In the embodiment shown in the Figures, jaw 2 is stationary, and jaw 4 is made to slide either (a) towards jaw 2 to cause gripping; or (b) to slide away from jaw 2 to release the gripping. In contrast to the prior art, the primary means for controlling the movement of the jaws (2, 4), to grip or release an object (e.g., base plate 108), is accomplished by the rotation of an eccentric housing 8 (and its associated components) coupled to and around the jaws. In the drawings the clamping jaws (2, 4) are designed to grip a base plate 108. However, it should be understood that the clamping jaws may be used to clamp any other suitable or selected object. The jaws (2, 4) are designed to have gripping surfaces 22a, 22b which conform to the shape of contacting surfaces 118a, 118b of the base plate to be gripped, as shown in FIGS. 8 and 9. However it should be understood that the gripping surfaces 22a, 22b of the jaws may be custom designed to have any suitable shape to grip a selected item.

Figure 5A:
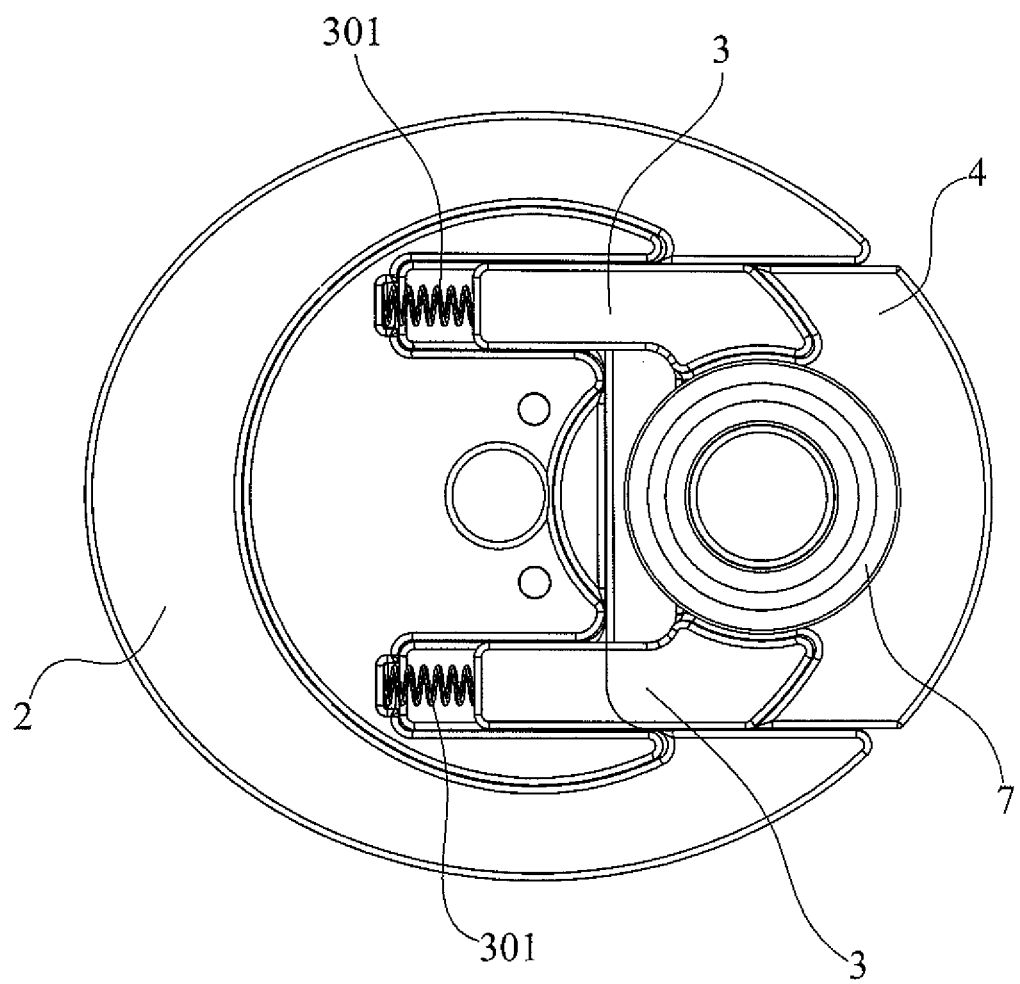
FIG. 5A is a simplified underside view of part of the assembly of clamping components used in practicing the invention.
Figure 5B:
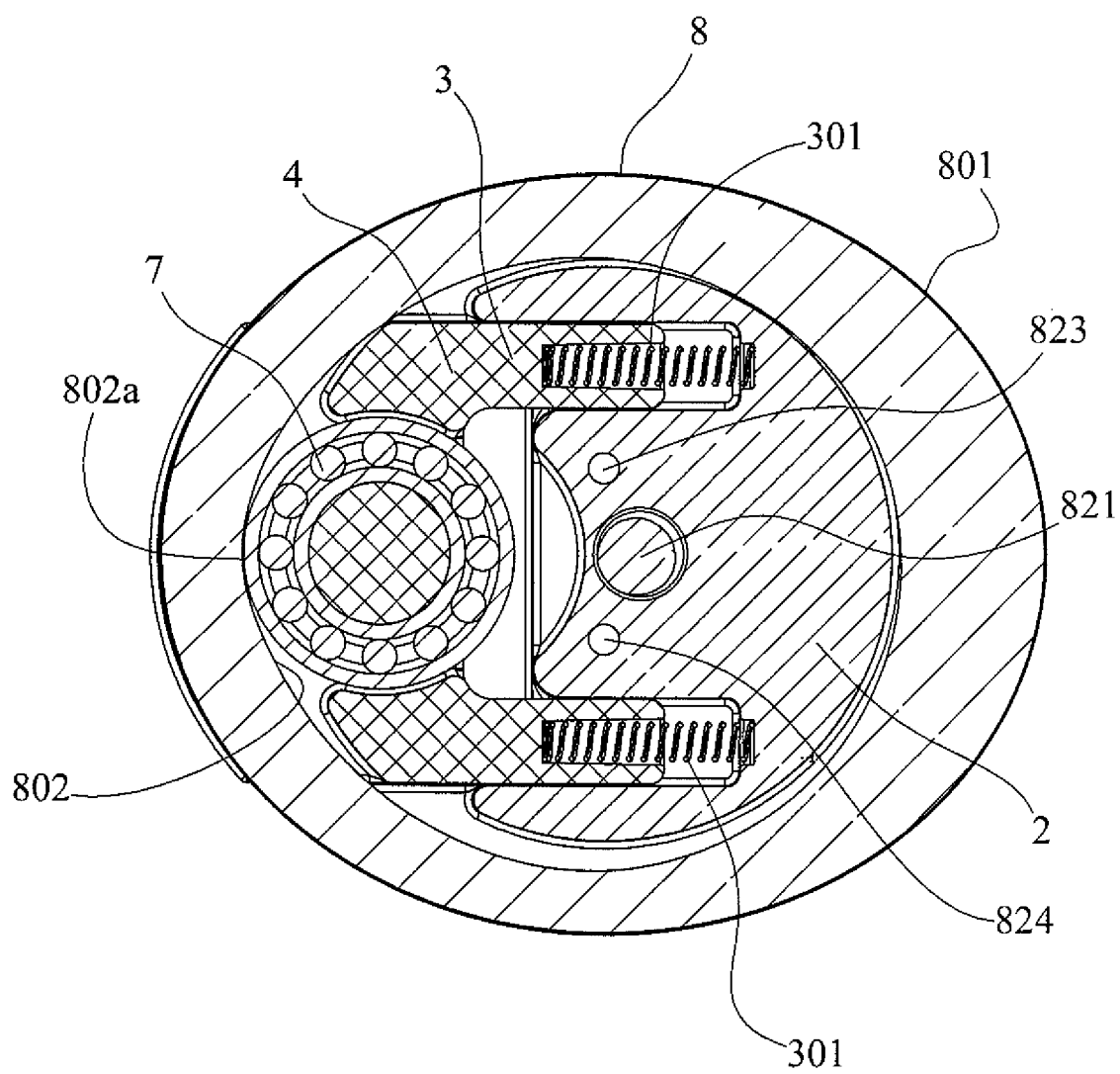
FIG. 5B is another simplified horizontal slice taken across the eccentric housing (8) and clamping plates (2, 4) used to practice the invention.

Referring to FIGS. 5, 5A and 5B, the moveable clamping jaw 4 is shown to have two guide arms 3 which extend underneath and within a rut formed in jaw 2 as shown in the underside view of FIG. 5A. Retraction springs 301 are located within extension guide arms 3 of jaw 4 and extend external to arms 3 to contact jaw 2 and push against jaw 2 when jaw 4 is advanced towards jaw 2. The retraction springs 301 are connected to movable jaw 4 to tend to cause it to slide out (to be pushed out) away from portion 2 when release button 5 is activated and the clamping mechanism is reset (released). Thus, the springs 301 that are attached to the arms 3 of the sliding jaw 4 are: (a) compressed when the eccentric housing 8 is rotated in a first direction to clamp an object; and (b) push jaw 4 back out and tend to cause jaw 4 to slide out when the eccentric housing rotates in the opposite direction, to the first direction, and the release button 5 is activated.

Further detailed below is the clamping action (gripping/tightening and release/loosening of objects) of the clamping jaws (2, 4) which is controlled by means of a jaw movement controlling mechanism which includes components numbered 5-10 in the Figures.

Housing 8, designed to contain the components used to enable and control the clamping action of clamping jaws 2 and 4, has an outer ring-like surface 801 and an inner surface 802. The outer surface 801 of housing 8 is designed to enable a user to grasp the outer surface and easily rotate the housing. The inner surface 802 of housing 8 has an eccentric shape (e.g., ovate or elliptical) above a region (lip) 803 and a circular shape below region (lip) 803. Referring to FIGS. 5, 5E and 5F, note that the inner surface of housing 8 has 3 regions. The upper inner surface 802 is eccentric (e.g., ovate or elliptical), the mid region 803 is a lip or ledge, and the lower region 804 is circular. In the embodiment shown in FIGS. 5, 5A, 5B, 5E, 5F and 7-9 a bearing 7 is positioned between the "eccentric" portion of surface 802 and jaw 4. Bearing 7 is attached to the underside of movable clamp portion 4 and contacts the inner surface of eccentric housing 8 as shown in detail in FIGS. 5A and 5B. Bearing 7 is rigidly attached to the sliding jaw 4. As shown in FIG. 5B, the outside surface of bearing 7 rolls along the inner eccentric surface 802 of rotatable housing 8. Contact point 802a is the tangent point where the bearing 7 contacts the surface 802. That is, the upper portion of inner surface 802 has an eccentric shape that contacts bearing 7 (at point 802a above level 803) which is attached to the underside of movable plate portion 4.

Bearing 7 functions to significantly reduce the friction of the clamping mechanism. It allows a user to more easily clamp jaws 2 and 4 together when rotating housing 8, to effectuate clamping. The eccentric shape of the inner surface of housing 8 (above level 802a) is designed to allow bearing 7 to ride on a surface that gets closer to the center of the housing as housing 8 rotates to either tighten or loosen the jaws. When housing 8 is rotated in a direction to cause clamping, its "eccentric" inner surface forces the bearing 7 to be pushed inwards (to the right in FIG. 5B) and simultaneously the sliding jaw 4 is forced to move to the right towards the stationary jaw 2. That is, when eccentric housing 8 rotates, in the predetermined clamping direction, its inner eccentric shaped surface 802 pushes against bearing 7 and forces movable jaw 4 to move/slide towards stationary jaw 2 to effectuate clamping.

The inner surface 804 of housing 8 below level 803 (see FIGS. 5, 5E and 5F) is circular. It is concentric and is also concentric with surface 1003 of ratchet plate 10 and bushing (ring) 9. The shape of the lower inner surface of housing 8 is not critical to the function. It can be used to cover accessories, used for rotation indication marks, or can be used for extra support for housing when combined with another accessory. Mounting hole 821 allows for the mounting screw 1 to pass through and hold selected components in place. Holes 823, 824 are provide for positioning various components.

Figure 5C:
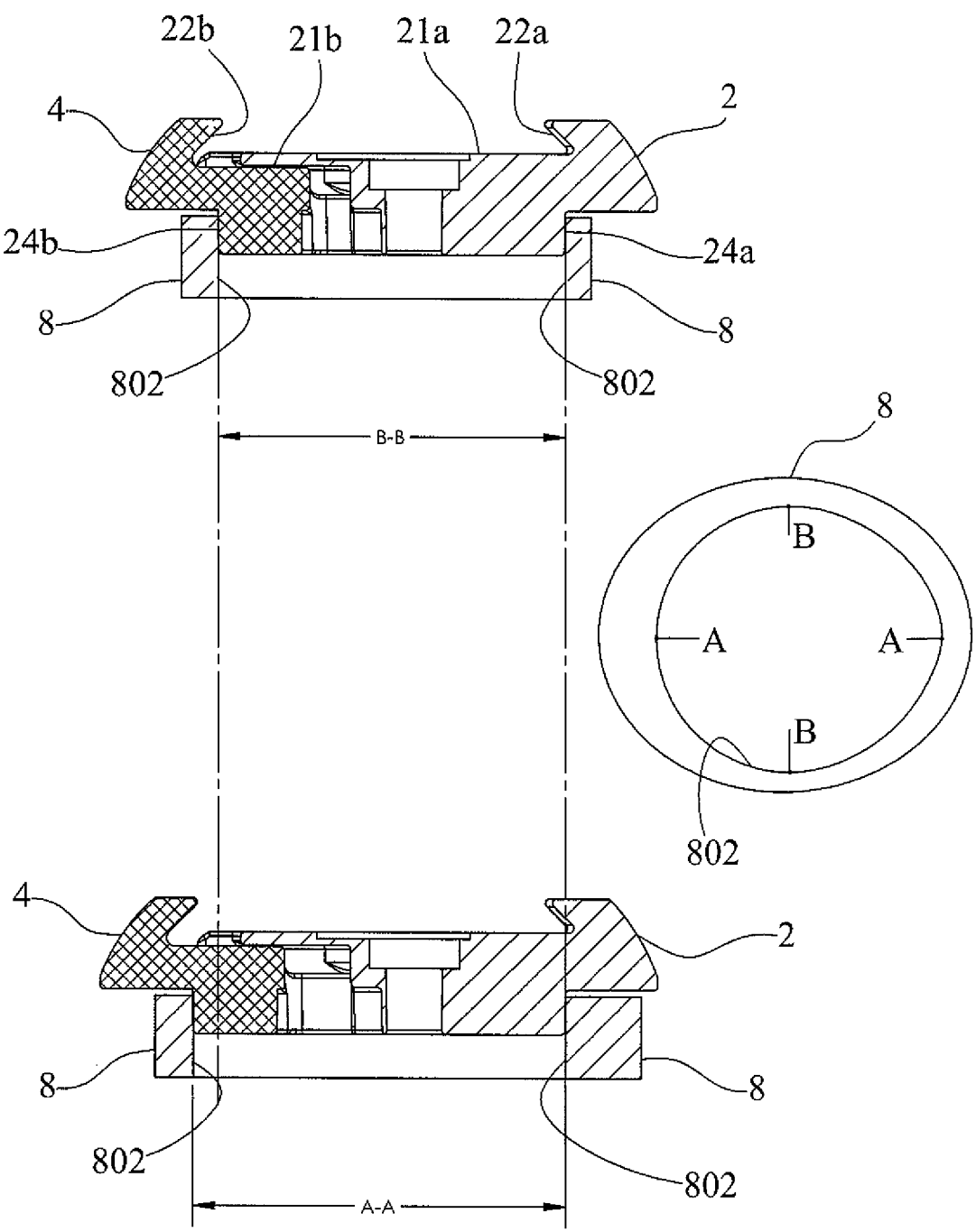
FIG. 5C is an idealized symbolic representation of the movement of the clamping jaws in response to rotation of an eccentric housing in accordance with the invention.
Figure 5D:
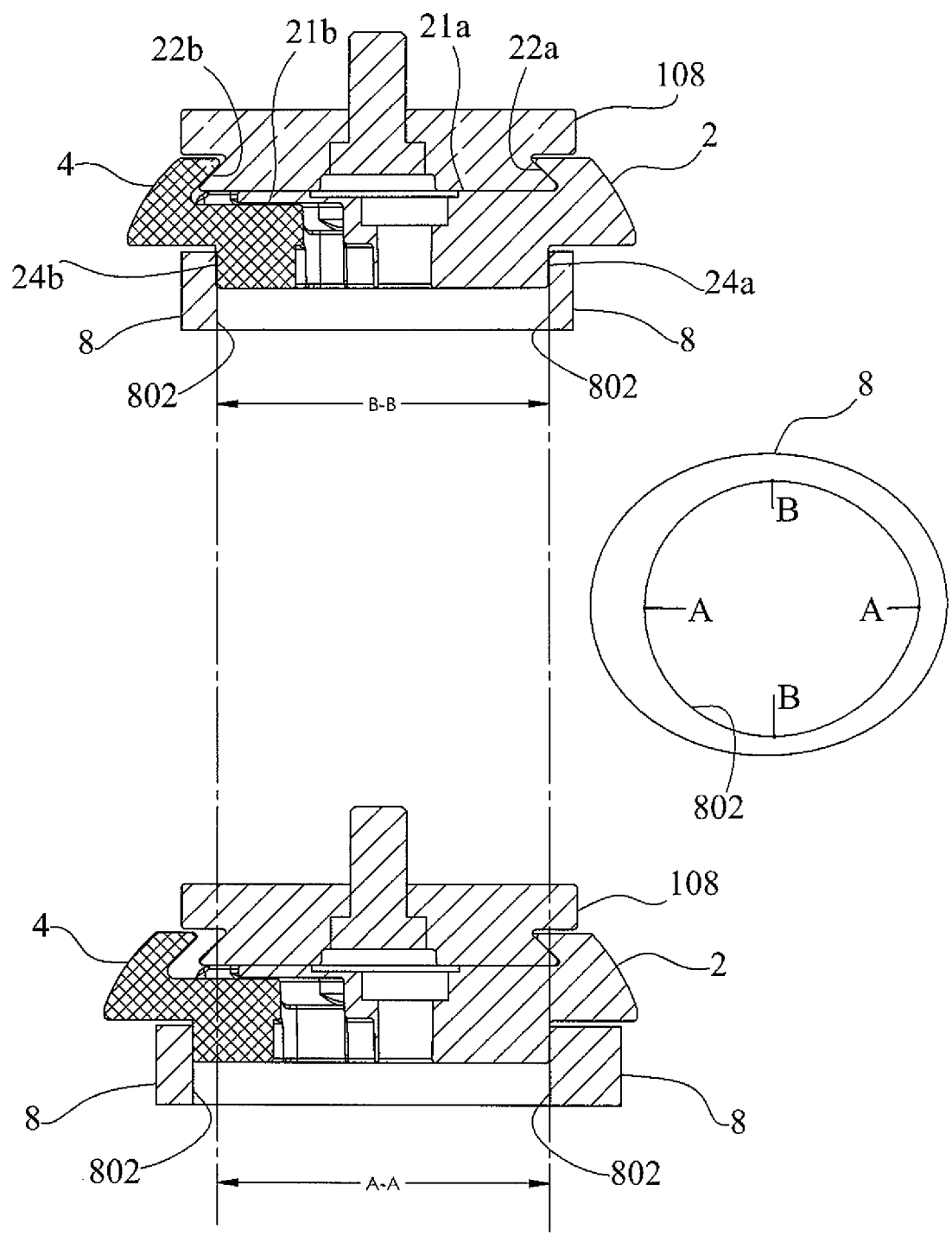
FIG. 5D is an idealized symbolic representations of the movement of the clamping jaws and the grasping or release of a base plate in response to rotation of an eccentric ring, in accordance with the invention.
Figure 5E:
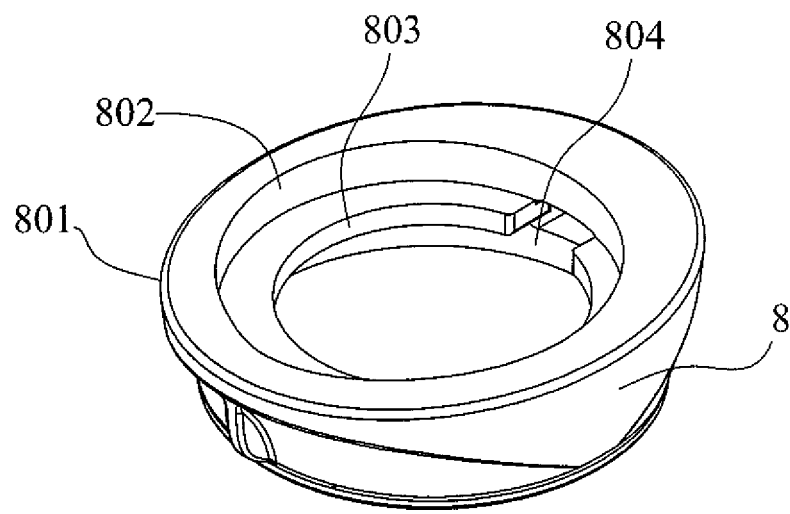
FIG. 5E is an enlarged isometric view of the housing 8 detailing the shape of its inner surface.
Figure 5F:
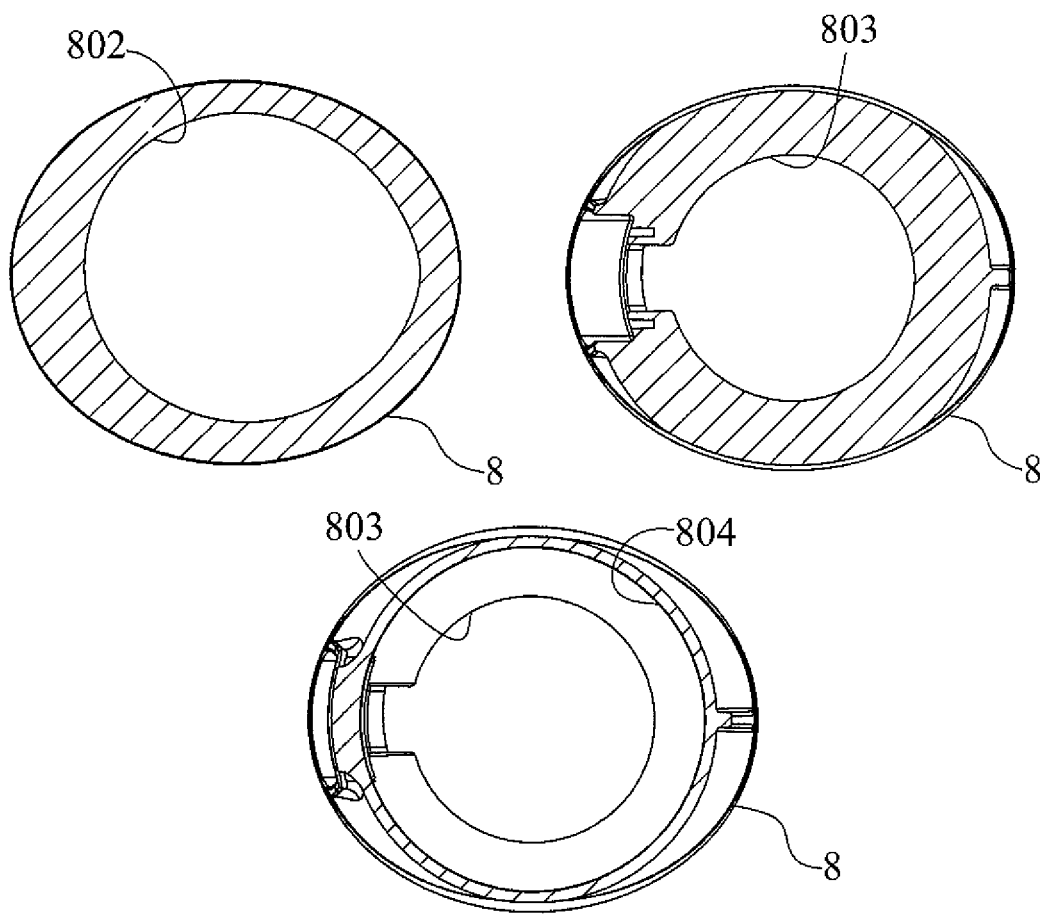
FIG. 5F are views of slices taken across the top (802), middle (803) and bottom (804) regions of the inner surface of housing 8.

The idealized showings of FIGS. 5C and 5D (in which bearing 7 is omitted) illustrate the clamping operation for an "eccentric" housing 8 whose inner surface 802 has an assumed elliptical with minor axis B-B and a major axis A-A; where the major and minor axes of the elliptical housing are diameters (lines through the center) of the ellipse, with the major axis being the longest diameter and the minor axis being the shortest. Maximum gripping of the two jaws (2, 4) would occur when the housing 8 is rotated so minor axis (B-B) of the ellipse is contacting and pushing against the outer surfaces of the two jaws (2, 4). The two jaws (2, 4) would be most separated (released or reset) when the housing 8 is rotated so the major axis (A-A) of the ellipse is contacting the outer surfaces of the two jaws (2, 4). FIG. 5D illustrates that: (a) a base plate 108 would be tightly clamped within jaws 2 and 4 when housing 8 has been rotated so that the minor axis (B-B) is spanning jaws 2 and 4; and (b) the base plate would be released from the clamp condition when the major axis (A-A) is spanning jaws 2 and 4. Thus, when rotatable housing 8 rotates in the clamping direction it forces jaws 2 and 4 to move/slide towards each other to clamp/grip an object between jaws 2 and 4. When the housing 8 is rotated in the opposite direction the two jaws can move away from each other and release the object.

In accordance with the principle described above, in the embodiment shown in FIGS. 5, 5A, 5B and 7-9, the top inner portion of rotatable housing 8 (above level 803) has an eccentric profile which is shaped to: (a) selectively force the bearing 7 inwards, thus forcing the sliding jaw 4 inwards towards jaw 2 in order to clamp a base plate (or any suitable item) positioned between the two jaws (2,4); or (b) selectively enable bearing 7 to move outwards and enabling jaw 4 to move outwards, away from jaw 2 (when release button 5 is activated) in order to loosen the clamping of a base plate (or any suitable item) positioned between the two jaws (2,4).

As already noted, a user can rotate eccentric housing 8 by grasping its outer surface 801. As housing 8 rotates, in the clamping direction, the moveable clamping jaw 4, slides closer to the stationary clamping jaw 2. Thus, when housing 8 is rotated in the clamping direction the gripping surface 22b of movable jaw 4 pushes against the base plate 108 which locks the bae plate in place between clamping jaws 2 and 4. Housing 8 can theoretically be made to rotate a full 360 degrees. However, in practice the ratchet plate 10 is machined to enable the housing to rotate up to 180 degrees to fully engage the base plate 108.

Figure 6:
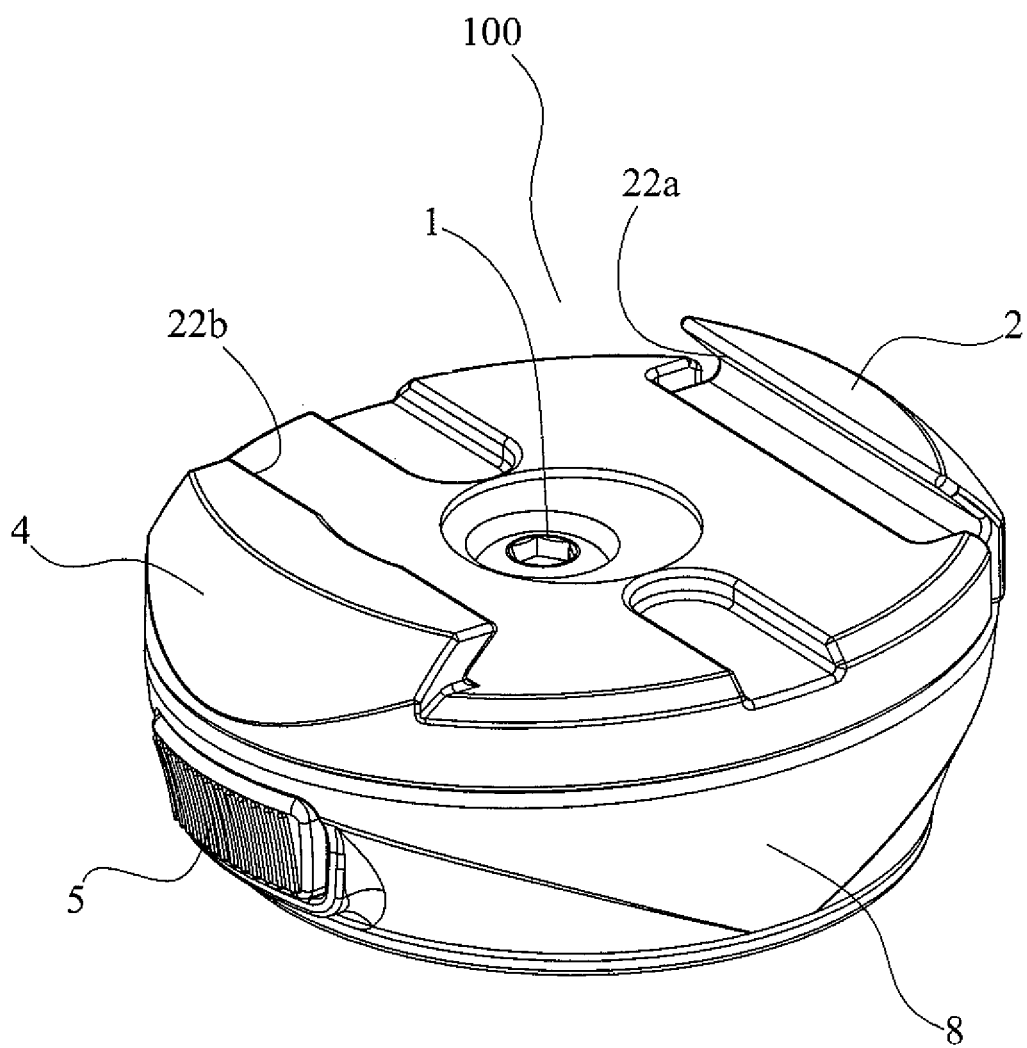
FIG. 6 is an enlarged drawing of an assembled clamping apparatus embodying the invention.

FIG. 6 is an enlarged view of an assembled clamping apparatus 100 embodying the invention. An object to be clamped can be mounted between gripping surfaces 22a and 22b of clamping jaws 2 and 4. The housing 8 can be rotated by a user to cause the clamping action (jaws 2 and 4 to move towards or away from each other) and button 5 mounted within the wall of housing 8 to rotate correspondingly. When housing 8 is rotated in a direction to cause clamping the ratchet teeth of button 5 engage the teeth of ratchet plate 10 (see FIGS. 5, 10 and 10A, 10B and 10C) to prevent slippage of the clamping jaws (2, 4).

FIG. 7 is a simplified cross sectional diagram of a clamping apparatus 100 shown in FIG. 6 and containing the components shown in FIG. 5. It shows the respective positioning of Jaws 2 and 4, housing 8, release switch 5, bearing 7, bushing 9, ratchet plate 10 and fastening screw 1.

FIG. 8 is a simplified cross sectional diagram of the clamping mechanism of FIG. 7 with base plate 108 mounted on and clamped within clamping jaws 2 and 4. Note gripping surfaces 22a and 22b of jaws 2 and 4, respectively contacting surfaces 118a and 118b of base plate 108. In this embodiment the gripping surfaces 22a, 22b of the clamping jaws (2, 4) are designed to mesh with the external surfaces 118a, 118b of base plate 108. Thus, gripping surfaces 22a, 22b of the base plate portions 2 and 4 may be shaped to make best contact with the external surfaces 118a, 118b of the base plate 108. However, as noted above the gripping surfaces may have any other suitable shape.

FIG. 9 is a highly simplified cross sectional diagram of the clamping mechanism embodying the invention with a base plate 108 and a camera mounted thereon and the mechanism mounted on a tripod 90.

In FIGS. 8 and 9, the base plate 108 is clamped in place when surfaces 22b and 118b make contact, and when surfaces 22a and 118a make contact. The stationary clamp plate 2 is fixed to the main support using fastener 1.

Release button 5 is mounted within an opening formed in housing 8 and includes ratchet teeth 51 (see FIGS. 10, 10A, 10B) dependent therefrom. Ratchet teeth 51 interact with the teeth 151 of ratchet plate 10. Release button springs 6 are attached to button 5 (see FIGS. 5 and 10) to keep the ratchet teeth 51 engaged with the teeth 151 of ratchet plate 10. Thus, when eccentric housing 8 is rotated in a predetermined clamping direction, the teeth 51 of button 5 engage the teeth of ratchet plate 10 and interlock to prevent slippage of the jaws. That is, the ratchet teeth 51 inside the lip of button 5 engage the ratchet teeth 151 inside the ratchet plate 10 causing them to lock in place due to the action of springs 6. Thus, the ratcheting mechanism (provided by teeth 51 and ratchet plate 10) prevents slippage when the housing 8 is being rotated to clamp jaws 2 and 4 together. When a user depresses the release button 5, the ratchet teeth 51 of the button 5 disengage from the ratchet teeth 151. The disengagement allows the two jaws (2, 4) to move apart easily and quickly.

Ratchet plate 10 (see FIG. 5) includes a central portion 1003 an outer rim 1001 and inner surface with ratchet teeth 151. Ratchet plate 10 is coupled with release button 5 and housing 8 in order to lock the clamping mechanism to avoid slippage when the jaws are being tightened. Button 5 can be pushed to release the ratcheting lock. When release button 5 is pushed, the housing 8 can be rotated to unlock/slide the moving jaw 4 outward, thus releasing a clamped object (e.g., base plate 108). When a user lets go of the eccentric housing 8, it remains locked in place by the interaction of the release button 5 and ratchet plate 10.

To release the base plate 108, a user presses and holds the release button 5 and rotates the eccentric housing (8) in the opposite direction to the clamping direction and the retraction springs 3 push the moving clamping jaw 4, which relieves the pressure on the base plate 108.

Bushing 9 is located between the eccentric inner surface portion of housing 8 and the ratchet plate 10. Bushing (ring) 9, mounted on ratchet plate 10, functions to allow the housing 8 to rotate over and around the top surface of ratchet plate 10 easily with low friction.

As discussed above, the clamping function can be performed by rotating housing 8. Alternatively, due to the nature of the clamping mechanism embodying the invention, a base plate 108 (or any suitable object) can be inserted between jaws 2 and 4 and rotated to cause jaws 2 and 4 to clamp the base plate (or any suitable object). A camera 200 (or any suitable object) can then be mounted on the base plate. Still further, a camera (or any suitable object) can be mounted on a base plate and the assembly can then be inserted between jaws 2 and 4 and rotated to cause jaws 2 and 4 to clamp the assembly. That is, the object to be clamped can be inserted between jaws 2 and 4 and the object can then be rotated to cause the jaws to tightly clap the item to the same extent as rotating housing 8. This is a form of "self-clamping" by the object to be clamped.

Thus, a clamping apparatus 100 embodying the invention can function as a clamp for a base plate 108 on which a camera 200 may be mounted. The clamping assembly 100 is designed such that when, and after, the camera 200 and base plate 108 are mounted on and within the clamping mechanism 100, the camera/base plate assembly (108, 200) can be securely locked to the clamping mechanism 100 by rotating the camera/base plate assembly in a predetermined clamping direction.

After a selected object (e.g., camera/base plate assembly) is clamped between jaws 2 and 4, the object can be released (unlocked) by pushing a release button 5, and rotating the camera/base plate in the opposite direction to the clamping direction. In instances where the clamping assembly 100 is firmly attached to a tripod, or like structure, rotating a camera or base plate assembly (200, 108) so it gets locked with the clamp 100 can be done with one hand and relatively quickly. Likewise the release of the camera or base plate assembly (200, 108) can be done with one hand and also quickly.

It should be appreciated that the bottom portion of mounting screw 1 may be used to attach the entire clamping assembly 100 to a tripod 90, a ball mount, or any other camera stabilizing equipment. Thus, the underside of ratchet plate 10 may be mounted on and attached to the surface of a camera tripod, ball-mount, or other camera stabilization equipment 90.

As already noted, the clamping assembly 100 includes a clamping mechanism 22 having a stationary portion (jaw 2) and a movable portion (jaw 4). The stationary clamp portion 2 remains fixed and allows an object (e.g., base plate 108), located between Jaws 2 and 4, to be clamped against the wedge shaped gripping surfaces 22a, 22b. The movable jaw 4 can slide inwards, towards stationary plate portion 2, in order to clamp (lock) the base plate 108 between the gripping surfaces of jaws 2 and 4. Or, movable jaw 4 can slide out, away from jaw 2, in order to allow unclamping (release) to enable a clamped object (e.g., camera and base plate assembly) to be removed.

Clamping apparatus 100 embodying the invention enables a user to have numerous different operating options to secure selected components (e.g., baseplate and/or camera) to selected camera stabilizing equipment (e.g., 90). By way of example a base plate can be inserted between the clamping jaws or a camera can be mounted on the base plate and the combination can then inserted between the clamping jaws. Due to the design of clamping apparatus, for either case, a user can easily access rotatable housing 8 and rotate it until the camera is firmly locked in place. As noted above, the system can be designed to have 360 degrees of rotation, although in a particular embodiment the design was limited to 189 degrees.

Alternatively, as already noted, the object (e.g., base plate 108 and/or camera and base plate) can be inserted between the clamping jaws and with clamping apparatus held stationary, the object can be rotated causing the object to be clamped between the jaws of clamping apparatus 100. The clamp assembly is then locked and it securely fixes the camera in place.[K1][K2] If the clamping apparatus is stationary, then the camera/base plate combination is rotated by a user.

As noted above an aspect of the invention is that a base plate (with or without a camera mounted thereon) can be inserted between the gripping surfaces of the two jaws (2, 4) and the base plate can then be rotated to cause the slidable jaw to move inward and grip the base plate. The structure of the movement mechanism allows this to happen.

What is claimed is:

1. A clamp for a camera mount comprising:
   two clamping jaws slidably coupled to each other so they can move towards or away from each other along a common plane; each one of said clamping jaws having an internal surface and an exterior surface, the internal surfaces of said clamping jaws facing each other;
   a jaw movement controlling mechanism including a rotatable housing having: (a) a graspable external surface for rotating said controlling mechanism; and (b) an eccentrically shaped inner surface coupled around the exterior surfaces of the two clamping jaws for controlling the movement of the two clamping jaws towards or away from each other in response to the rotation of the housing; and
   a ratcheting mechanism coupled to the jaw movement controlling mechanism for preventing slippage of the two clamping jaws when the two clamping jaws are moving towards each other.

2. A clamp as claimed in claim 1, wherein the ratcheting mechanism includes a release button for releasing the ratcheting function and enabling the jaws to move away from each other.

3. A clamp as claimed in claim 1, wherein one of the two clamping jaws is stationary and the other clamping jaw is moveable and moves towards or away from the stationary jaw in response to the shape of the inner surface of said housing as it is being rotated.

4. A clamp as claimed in claim 3, wherein there is at least one spring extending between the moveable clamping jaw and the stationary clamping jaw to provide a push back force for an unclamped condition.

5. A clamp as claimed in claim 4, wherein said ratcheting mechanism includes a ratchet plate with a toothed portion, and wherein said ratcheting mechanism also includes a release button mounted on said housing, said release button including a toothed portion for engaging the toothed portion of said ratchet plate for locking the movement of the moveable jaw when a clamping function is being performed and for releasing the ratcheting function and enabling the jaws to move away from each other.

6. A clamp as claimed in claim 4 wherein a bushing is located between the eccentric inner surface portion of housing 8 and the ratchet plate to enable the housing to rotate more smoothly.

7. A clamp as claimed in claim 3 wherein a bearing is located between the inner surface of the eccentric housing and the moveable jaw.

8. A clamp as claimed in claim 1, where the eccentrically shaped inner surface of said housing is shaped to provide for specific movement of the sliding jaw to accommodate various clamping loads.

9. A clamp as claimed in claim 1 wherein said housing has an upper portion and a lower portion; the inner surface of said upper portion being said eccentrically shaped inner surface for controlling the movement of the jaws, and said lower portion having a circular inner surface.

10. A clamp as claimed in claim 1 wherein said camera mount is a base plate on which a camera is to be attached, and wherein said jaws have gripping surfaces shaped to grip the base plate.

11. The clamp as claimed in claim 1 wherein an object to be clamped is inserted between the two clamping jaws and clamping is effectuated by either rotating said housing and holding the object stationary or holding said housing stationary and rotating said object and the jaws in a clamping direction.

12. The clamping apparatus as claimed in claim 11, wherein clamping of said object is effectuated by either rotating the specified object inserted between the two jaws and maintaining said inner surface stationary, or maintaining said object stationary and rotating said inner surface.

13. Clamping apparatus for a specified object comprising:
two clamping jaws slidably coupled to each other so they can move towards or away from each other along a common plane in order to selectively clamp said specified object inserted between the two clamping jaws; each one of said clamping jaws having an internal surface and an exterior surface, the internal surfaces of said clamping jaws facing each other;
a rotatable jaw movement controlling mechanism having an inner ovate surface coupled around the exterior surface of at least a portion of the two clamping jaws; said inner surface being shaped for controlling the movement of the two clamping jaws towards or away from each other when said rotatable jaw movement controlling mechanism is rotated; and
a ratcheting mechanism coupled to the jaw movement controlling mechanism for preventing slippage of the two clamping jaws when the two clamping jaws are moving towards each other.

14. A clamp for a camera mount comprising:
two clamping jaws slidably coupled to each other so they can move towards or away from each other along a common plane; each one of said clamping jaws having an internal surface and an exterior surface, the internal surfaces of said clamping jaws facing each other; and
a jaw movement controlling mechanism including a rotatable housing having an eccentrically shaped inner surface coupled around the exterior surfaces of said two clamping jaws and said housing having an external surface graspable by a user for rotating said controlling mechanism for causing the two clamping jaws to move towards or away from each other.

15. The combination as claimed in claim 14 further including a bearing located between the inner surface of the eccentric housing and the moveable jaw.

16. The combination as claimed in claim 14 wherein said housing has an upper portion and a lower portion; the inner surface of said upper portion being said eccentrically shaped inner surface for controlling the movement of the jaws, and said lower portion having a circular inner surface.

\* \* \* \* \*